Patented Feb. 20, 1923.

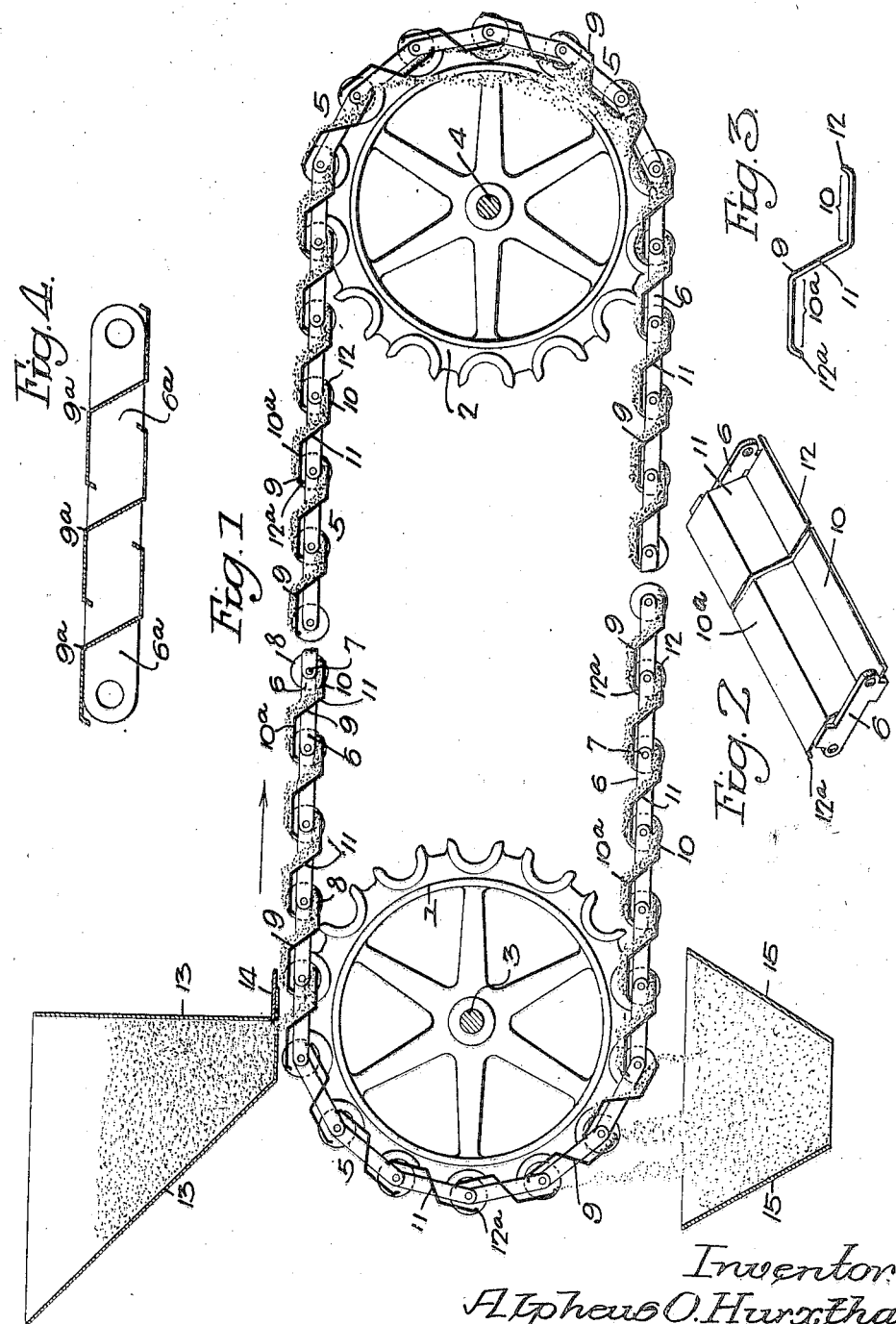

1,446,308

UNITED STATES PATENT OFFICE.

ALPHEUS O. HURXTHAL, OF PHILADELPHIA, PENNSYLVANIA, ASSIGNOR TO PROCTOR & SCHWARTZ, INCORPORATED, OF PHILADELPHIA, PENNSYLVANIA, A CORPORATION OF PENNSYLVANIA.

CONVEYER.

Application filed August 21, 1920. Serial No. 405,085.

*To all whom it may concern:*

Be it known that I, ALPHEUS O. HURXTHAL, a citizen of the United States, residing in Philadelphia, Pennsylvania, have invented certain Improvements in Conveyers, of which the following is a specification.

One object of my invention is to construct a conveyer so that material can be discharged into the conveyer while it is in motion, air in circulation being allowed to pass through the spaces between the pans of the conveyer.

A further object of the invention is to transfer the material from one side of one pan to the opposite side of another pan as the conveyer passes around sprocket wheels from the upper to the lower runs.

In the accompanying drawing;—

Fig. 1 is a longitudinal sectional view embodying my invention;

Fig. 2 is a perspective view showing one of the pans on the connecting links;

Fig. 3 is an enlarged sectional view of one of the pans, and

Fig. 4 is a view illustrating a link to which a series of pans are attached.

In the present instance 1 and 2 are sprocket wheels mounted respectively on shafts 3 and 4, one of which may be a driven shaft. 5 is an endless chain conveyer made up of two series of links 6 pivotally connected at 7, and mounted on rollers 8. There are two sprocket wheels on each shaft 3—4 spaced a given distance apart, and the chains pass around these sprocket wheels and are connected by the pans 9, which extend from one chain to the other, as clearly shown in Fig. 2. The pans are made to hold material on both the upper and lower run of the conveyer, and each pan has carrying sections 10 and 10ª of any suitable form, and these sections in the present instance are connected by an inclined member 11 and flanges 12 and 12ª are preferably provided as clearly shown in Fig. 3.

The pans are spaced apart, as shown, and one pan overlaps an adjoining pan. This construction allows for the free circulation of air through the spaces between the pans. 13 is a hopper of any suitable construction for feeding the material to the pans of the conveyer, and this hopper may be provided with a gate 14 of any suitable form for regulating the flow of the material, and 15 is a receiving hopper for the material as it is discharged from the conveyer.

In Figs. 1, 2, and 3 I have illustrated each link connected to a single pan, but in some instances the links may be increased in length, and may carry two or more pans as illustrated in Fig. 4, which shows three pans 9ª, secured to a single pair of links 6ª.

The operation is as follows:—

The conveyer is driven in the direction indicated by the arrow, Fig. 1, and there is a constant stream of material flowing on to the conveyer. This material finds its lodgment in the sections 10 of the pans 9 as well as on the other flat surfaces of the pan as indicated in Fig. 1, and air is free to circulate through the spaces between the pans. When the conveyer passes around the sprocket wheels 2, or its equivalent, the material flows by gravity from the pans, and falls on to the opposite sides of the pans which have preceded it and accumulates on the sections 10ª of the pans, and also on the back of the other flat surfaces. The material is carried in this manner until the conveyer passes around the sprocket wheels 1 to the first position; as the pans are tilted on the lower run, the material falls from the pans and into the hopper 15 or other suitable receptacle. By this construction the unnecessary chutes or transfer devices are dispensed with, as the material is automatically transferred from one pan to another, as the conveyer passes around one of the sprocket wheels. Furthermore, the material is allowed to fall a certain distance so that air will have an opportunity to pass through the mass is it falls, and the material will be opened up and reassembled on the lower run of the conveyer.

While I have shown a particular form of pan having sections 10 and 10ª, the pans may be modified without departing from the main features of the invention—and a series of conveyers may be arranged one under the other so that material from the lower run of one conveyer will be discharged onto the upper run of another conveyer.

I claim:

1. The combination in an endless chain conveyer, of endless chains; a series of pans thereon arranged to carry material on both the upper and lower run of the conveyer, one pan overlapping another to allow material to be fed to the conveyer without waste, the pans being arranged so that a clear space is provided between the pans for the free circulation of air.

2. The combination in an endless chain conveyer, of endless chains; sprocket wheels around which the conveyer chains pass; and pans secured to the chains, each pan having two parallel sections connected by an inclined section, said pans overlapping and spaced apart for the free circulation of air between the pans.

3. The combination in an endless chain conveyer, of two endless chains; sprocket wheels around which the chains pass; and pans extending from one chain to the other, each pan having two flat surfaces on different planes and having an inclined section connecting the flat surfaces, the pans being flanged at the edges and arranged to overlap one another, and spaced apart to allow air to circulate between them.

ALPHEUS O. HURXTHAL.